(12) United States Patent
Usami

(10) Patent No.: US 7,242,446 B2
(45) Date of Patent: Jul. 10, 2007

(54) LIQUID CRYSTAL DISPLAY APPARATUS

(75) Inventor: Tomohide Usami, Okazaki (JP)

(73) Assignee: DENSO Corporation, Kariya (JP)

( * ) Notice: Subject to any disclaimer, the term of this patent is extended or adjusted under 35 U.S.C. 154(b) by 228 days.

(21) Appl. No.: 11/073,567

(22) Filed: Mar. 8, 2005

(65) Prior Publication Data

US 2005/0212994 A1      Sep. 29, 2005

(30) Foreign Application Priority Data

Mar. 26, 2004    (JP)    ............... 2004-091806

(51) Int. Cl.
*G02F 1/1335*   (2006.01)
(52) U.S. Cl. .......................... 349/66; 349/62
(58) Field of Classification Search ............ 349/61–67, 349/11
See application file for complete search history.

(56) References Cited

U.S. PATENT DOCUMENTS 4,874,957 A * 10/1989 Sasaki et al. ............ 250/208.1
5,526,065 A * 6/1996 Todoriki ..................... 348/832
6,444,076 B1 * 9/2002 Herndon et al. ............ 156/249
2004/0246392 A1 * 12/2004 Maruyama et al. .......... 349/11

FOREIGN PATENT DOCUMENTS

| JP | 05061034 A * | 3/1993 |
| JP | A-H05-61034 | 3/1993 |
| JP | A-H07-306411 | 11/1995 |
| JP | A-H09-304607 | 11/1997 |

* cited by examiner

*Primary Examiner*—Jared J. Fureman
*Assistant Examiner*—Paultep Savusdiphol
(74) *Attorney, Agent, or Firm*—Posz Law Group, PLC

(57) ABSTRACT

A liquid crystal display apparatus includes a liquid crystal display panel, a backlight source behind the liquid crystal display panel, and an optical filter interposed between the liquid crystal display panel and the backlight source for controlling a direction of light passing through the liquid crystal display panel. The optical filter has a plurality of horizontal louvers vertically arranged in a column and perpendicularly disposed to a surface of the liquid crystal display panel. The differences in light reflectivity and transmittance between an upper surface and a lower surface of the louver give the optical filter a half mirror function that controls a direction of a passing light therethrough.

5 Claims, 2 Drawing Sheets

LIQUID CRYSTAL DISPLAY APPARATUS

CROSS REFERENCE TO RELATED APPLICATION

This application is based on Japanese Patent Application No. 2004-91806 filed on Mar. 26, 2004, the disclosure of which is incorporated herein by reference.

FIELD OF THE INVENTION

The present invention relates to a liquid crystal display apparatus for a vehicle, more specifically to a liquid crystal display apparatus having an optical filter for controlling a light passing therethrough.

BACKGROUND OF THE INVENTION

A conventional liquid crystal display apparatus used in, for example, a car navigation system for displaying a map or the like typically has a backlight source behind a liquid crystal display panel. It is disposed at an underside of a windshield and at an upper center of an instrument panel. The positioning of the liquid crystal display apparatus makes it easier for a driver to view an image in the apparatus because it minimizes the movement of the driver's sightline. However, an image displayed on the apparatus reflects on an inside surface of the windshield disposed over the instrument panel during night hours and interrupts the driver's view.

Another conventional apparatus disclosed in a Japanese Patent Document JP-A-H7-306411 has an optical waveguide disposed in front of a backlight source to guide a backlight perpendicular to a liquid crystal display panel. However, the optical waveguide does not effectively limit the backlight projected therethrough in an obliquely upward direction. Thus, the apparatus cannot effectively prevent reflection of the displayed image on the inside surface of the windshield.

Still other conventional apparatus disclosed in a Japanese Patent Document JP-A-H5-61034 has a polarizing film disposed between a backlight source and a liquid crystal display panel to direct the backlight perpendicular to the liquid crystal display panel. This type of polarizing film is available as a marketed product of "Light Control Film" released from corporations such as Sumitomo 3M. This apparatus substantially limits a viewing position of the liquid crystal display panel only in a front area of the apparatus for an increased visibility. Thus, it effectively prevents reflection of the displayed image on the inside surface of the windshield during night hours.

While the liquid crystal display apparatus of this kind is primarily used for driving assistance such as a map display apparatus for a car navigation system or the like, the apparatus is more frequently used for displaying different types of image sources provided as a TV program, a video program, a DVD program or the like. On the other hand, the liquid crystal display panel itself is evolving to have a wider viewing angle for viewer's convenience.

Therefore, an image on the display panel of the apparatus may be viewed obliquely upward from a lower position by a viewer (e.g., a driver or a passenger) with the viewer's seat back reclined toward a rear end of a vehicle when, for example, the vehicle is stopping in a rest area. However, the conventional apparatus having the polarizing film described above cannot accommodate this kind of situation, because the viewing position of the apparatus is strictly limited to a small area in front of the apparatus. The visibility steeply decreases if the position of the viewer moves out of the area.

SUMMARY OF THE INVENTION

In view of the above-described problems, it is an object of the present invention to provide a liquid crystal display apparatus for a vehicle that has an improved visibility from an obliquely downward position while effectively preventing a displayed image from reflecting on an inside surface of a windshield of a vehicle.

An automotive liquid crystal display apparatus of the present invention uses an optical filter between a backlight source and a liquid crystal display panel to achieve the above-described object. The optical filter disposed between the backlight source and the liquid crystal display panel limits a projecting direction of a backlight with a plurality of louvers arranged in a column and disposed perpendicular to the surface of the liquid crystal display panel. The louver in the optical filter is characterized by the difference of its light reflectivity and transmittance for each of a downward light and for an upward light passing through the filter. Filtering the passing light in this manner enables the apparatus to limit the upward light and to allow the downward light.

The backlight of the apparatus is filtered to be perpendicular to the surface of the liquid crystal display panel by the louvers of the optical filter. Therefore, the visibility of the apparatus from a front position is improved. Further, the louver of the filter limits a light passing therethrough obliquely upward from behind the filter and allows a light passing therethrough obliquely downward from behind the filter. Therefore, reflection of the displayed image on the windshield is effectively prevented during night hours, and the visibility of the apparatus from the obliquely downward position of the display panel is improved.

The louver of the optical filter may be structured as a half mirror that practically passes a downward light from above the louver and practically reflects a downward light from under the louver. The intensity of the light passing through this louver downward is increased, because the louver passes a downward backlight therethrough and reflects an upward backlight to proceed in a downward direction. As a result, the visibility from the obliquely downward position of the liquid crystal display panel is improved.

More practically, the louver may be made of a transparent base material combined with a film that passes the downward light from above and reflects the upward light from under, or the louver may be made of a transparent base material with an underlying reflection film having many small windows dispersed for transparency.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Figure 1:
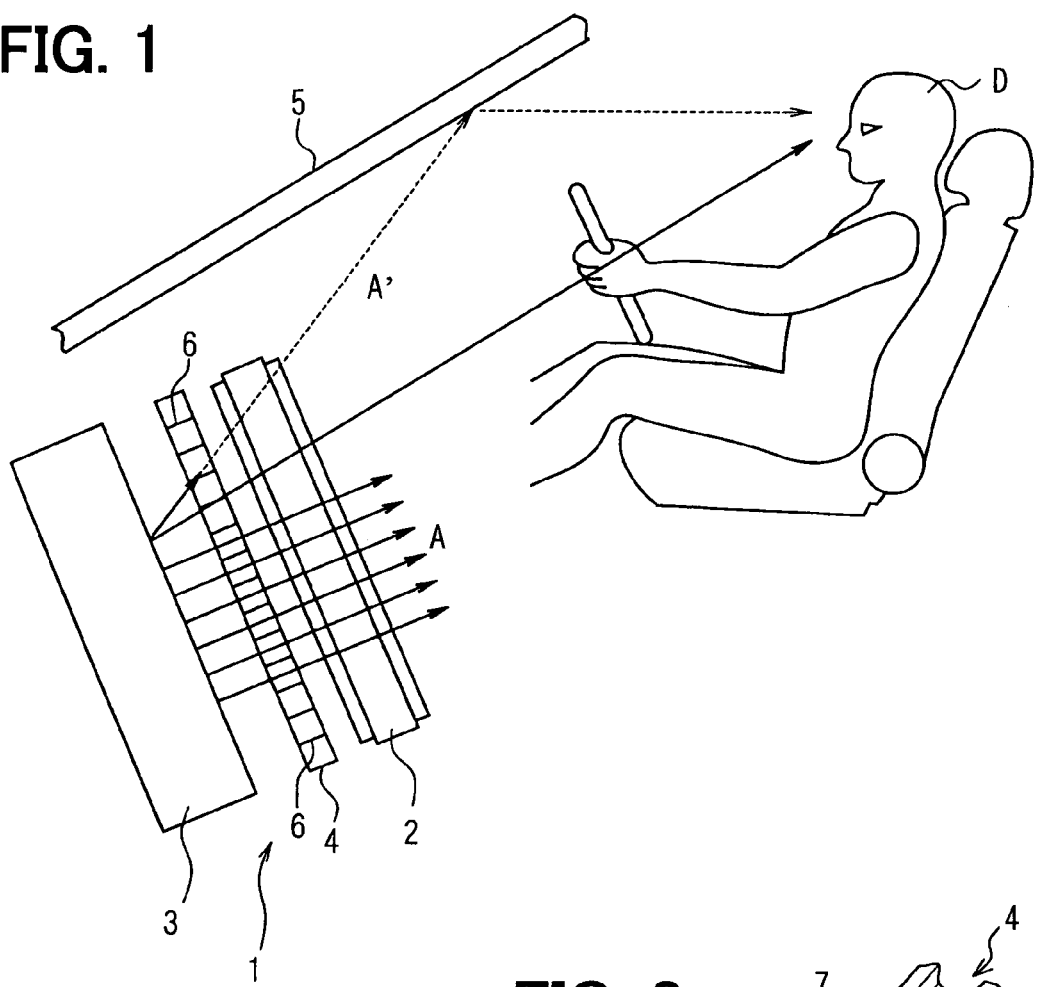
FIG. 1 is a schematic view of a structure of a liquid crystal display apparatus and its position in a vehicle according to an embodiment of the present invention.

The present invention is described hereinafter with reference to the drawings. Referring first to FIG. 1, an automotive liquid crystal display apparatus 1 according to this embodiment includes a liquid crystal display panel 2, a backlight source 3, and an optical filter 4 interposed between the display panel 2 and the backlight source 3. These parts are disposed in a case (or in a frame) not shown in the figure. The display panel 2 has a wide viewing angle. The optical filter 4 controls a projecting direction of a backlight from the backlight source 3.

The case contains, although not shown in the figure, a driver circuit for the liquid crystal display panel 2, a control circuit for the driver circuit, and a video conversion circuit or the like for converting a video signal from a TV tuner or a DVD player to a driving signal. The liquid crystal display panel 2 has a touch panel, not shown in the figure, on its face. A front side of the case has a control switch and the like in an area around the liquid crystal display panel 2.

The liquid crystal display apparatus 1 is disposed on an upper center face of an instrument panel (not shown in the figure) in front of a driver's seat. The display surface of the liquid crystal display panel 2 is tilted in order to fully oppose to a face (or an eye) of a driver. A windshield 5 is disposed above and over the instrument panel. The liquid crystal display apparatus 1 is connected to a main controller unit of a car navigation system (not shown in the figure), and the liquid crystal display panel 2 displays an image for navigation such as a map, a current vehicle position or the like. The liquid crystal display apparatus 1 receives an image signal from the TV tuner or the DVD player as well, and the liquid crystal display panel 2 displays the image from those sources.

Figure 2:
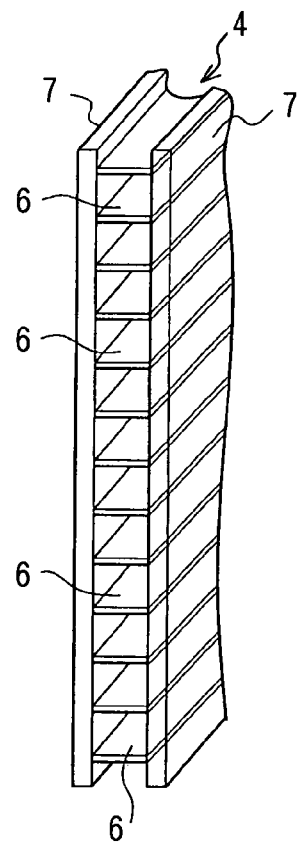
FIG. 2 is a perspective view of an optical filter.

The optical filter 4 has, as shown in FIG. 2, a substantially thin film shape of the thickness of 0.45 to 0.63 mm, having tiny crosspiece-like louvers 6 sandwiched by two transparent films 7, 7 made of, for example, PET. The louvers 6 extend laterally with their faces perpendicular to the surface of the optical filter 4. The louvers 6 are arranged equally spaced in parallel in a vertical column.

Figure 3:
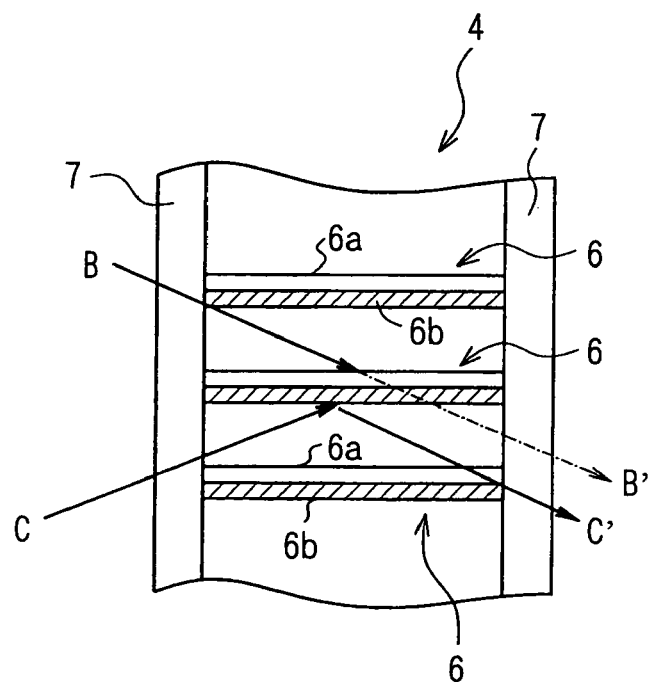
FIG. 3 is an expanded vertical cross-sectional view of the optical filter regarding a structure of a louver according to the embodiment of the present invention.

The louvers 6 have a different reflectivity and transmittance for each of a downward light passing therethrough from above and an upward light passing therethrough from under. The downward light from above has a positive entry angle against an upper surface of the louver 6, and the upward light from under has a negative entry angle against an upper surface of the louver 6. In this embodiment, the louver 6 having a half mirror structure practically passes a downward light B from above and reflects an upward light C from under, as shown in FIG. 3. That is, the upper surface of the louver 6 is low in reflectivity (i.e., high in transmittance), and the lower surface of the louver 6 is high in reflectivity (i.e., low in transmittance). More practically, the louver 6 is made of a transparent base material (e.g., a transparent plastic film) 6a with one side (e.g., lower side) having a selective transparency film 6b attached thereto. The selective transparency film 6b passes the downward light B therethrough from above but reflects the upward light C therethrough from under.

The liquid crystal display apparatus 1 is structured to light its display panel 2 with the backlight source 3. The optical filter 4 (the louver 6) in the apparatus makes the backlight directive in a direction perpendicular to the liquid crystal display panel 2 (as shown by an arrow A in FIG. 1), and viewing position of the display panel 2 is limited within a front area of the apparatus 1 with an improved visibility for a viewer in a fully opposing position.

The light C projected obliquely upward from the backlight source 3 substantially reflects on the lower side of the louver 6 in the optical filter 4 because the transmittance of the lower side of the louver 6 is low. Therefore, the light in a direction obliquely upward (e.g., in a direction of an arrow A' in FIG. 1) from the liquid crystal display panel 2 is limited. This structure effectively prevents the image on the liquid crystal display panel 2 from reflecting on the windshield 5 when the outside of the vehicle is dark during night hours.

The light B projected obliquely downward from the backlight source 3 substantially passes the optical filter 4 to become light B' as shown in FIG. 3. This makes the liquid crystal display panel 2 viewable from a downward position, and visibility of the display panel 2 from this position is secured. Moreover, the intensity of the light projected toward an obliquely downward direction from the display panel 2 is increased because the reflection of the light C from the lower surface of the louver 6 becomes light C' to be added to the light B'. Therefore, the visibility from the downward position of the display panel 2 is substantially increased.

As a result, a viewer (a driver D) can have an improved visibility of the image displayed on the liquid crystal display panel 2 in the apparatus 1 when the viewer watches the image of a TV program, a DVD movie or the like from the downward position of the display panel 2, sitting in a position reclined on the seat back of a vehicle while stopping in, for example, a rest area.

The optical filter 4 may be disposed with its louvers 6 having an angle other than a right angle to the surface of the display panel 2 (e.g., parallel to the light B' and the light C' in FIG. 3) if the filter 4 is used only for limiting the light C projected obliquely upward from the backlight source 3 beside being transparent for the light B. However, this structure limits a viewing angle of the display panel 2 to an area in a lower position of the display panel 2 and the visibility from a full frontal position is decreased.

The optical filter 4 may possibly be disposed in front of the liquid crystal display panel 2. That is, the filter 4 may be disposed between the display panel 2 and the touch panel. However, this structure results in a low viewing quality such as a decreased contrast of the displayed image, an exposure of the edge of the display panel 2 and the like. Therefore, the optical filter 4 disposed between the display panel 2 and the backlight source 3 with the louvers 6 perpendicular to the surface of the display panel 2 is more suitable.

According to the present embodiment, the optical filter 4 with louvers 6 perpendicular to the surface of the display panel 2 is disposed between the liquid crystal display panel 2 and the backlight source 3. The filter 4 practically passes the downward light B from above the louver 6 and practically reflects the upward light C from under the louver 6 to effectively prevent the displayed image on the display panel 2 from reflecting onto the windshield 5 while improving the visibility of the display panel 2 obliquely from the downward position of the apparatus 1.

Figure 4:
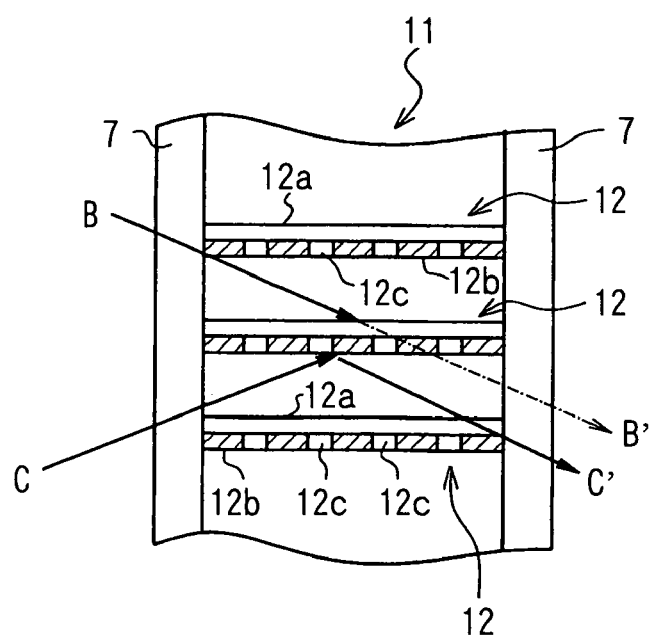
FIG. 4 is an expanded vertical cross-sectional view of the optical filter regarding a structure of a louver according to another embodiment of the invention.

Another embodiment of the present invention is shown in FIG. 4. The difference of this embodiment from the first one exists in a structure of louvers 12 in an optical filter 11. That is, the optical filter 11 has many equally spaced small louvers 12 arranged vertically in a column with their surfaces perpendicular to the surface of the optical filter 11. Each louver 12 is made of a transparent base material 12a with an underlying reflection film 12b attached thereto and having many transparent small holes (i.e., light windows) 12c dispersed (evenly spread) therein.

The louvers 12 have a different reflectivity and transmittance for each of the light passing downward and the light passing upward therethrough. That is, an upper surface of the louver 12 is low in reflectivity (i.e., high in transmittance), and a lower surface of the louver 12 is high in reflectivity (i.e., low in transmittance). Therefore, the optical filter 11 practically passes the downward light B from above and practically reflects the upward light C from under. Thus the reflection of the displayed image in the liquid crystal display panel 2 onto the windshield 5 is effectively prevented while the visibility obliquely from the downward position of the display panel 2 is substantially improved.

Although the present invention has been fully described in connection with the preferred embodiments thereof with reference to the accompanying drawings, it is to be noted that various changes and modifications will become apparent to those skilled in the art.

In place of adhering a film for a half mirror structure in the above embodiment, a metal foil may be disposed on one side of the base material (e.g., a resin film) by vapor deposition. The base material of the louver may be half-transparent or may be stained to have a color. The louver itself may be made of a material having a different reflectivity and transmittance for each of an obverse surface and a reverse surface.

Such changes and modifications are to be understood as being within the scope of the present invention as defined by the appended claims.

What is claimed is:

1. A liquid crystal display apparatus for a vehicle comprising:
   a liquid crystal display panel;
   a light source behind the liquid crystal display panel; and
   an optical filter interposed between the liquid crystal display panel and the light source for controlling a direction of a light passing through the liquid crystal display panel;
   wherein the optical filter has a plurality of horizontal louvers vertically arranged in a column and disposed perpendicularly to a surface of the liquid crystal display panel,
   wherein an upper surface of each of the horizontal louvers is configured to have a lower light reflectivity than a lower surface of each of the horizontal louvers, and
   configuration of each of the horizontal louvers allows a first light passing through the each louver from the upper surface to the lower surface, and prevents a second light passing through the each louver from the lower surface to the upper surface.

2. The liquid crystal display apparatus of claim 1, wherein the each louver serves as a half mirror that practically passes a light having a positive entry angle against the upper surface of the each louver, and practically limits a light having a negative entry angle against the upper surface of the each louver.

3. The liquid crystal display apparatus of claim 2, wherein the each louver is made of a base material having transparency combined with a film that passes a downward light therethrough and limits an upward light therethrough.

4. The liquid crystal display apparatus of claim 2, wherein the each louver is made of a base material having transparency combined with an underlying reflective film that has a large number of evenly dispersed light windows for passing the light therethrough.

5. The liquid crystal display apparatus of claim 1, wherein the each louver is disposed so as to control a reflection on a windshield of the vehicle of the light passing through the liquid crystal display panel, and to improve visibility for a viewer of an image displayed on the liquid crystal display panel from a lower position in the vehicle.

* * * * *